United States Patent [19]
Pondes

[11] Patent Number: 4,555,202
[45] Date of Patent: Nov. 26, 1985

[54] TOOL HOLDER WITH TOOL

[75] Inventor: Alfonsius A. T. Pondes, Doetinchem, Netherlands

[73] Assignee: Comato B.V., Doetinchem, Netherlands

[21] Appl. No.: 553,098

[22] Filed: Nov. 18, 1983

[30] Foreign Application Priority Data

Nov. 18, 1982 [NL] Netherlands .................. 8204473

[51] Int. Cl.⁴ ............................................. B26D 1/00
[52] U.S. Cl. .................................... 407/117; 407/111
[58] Field of Search ......... 407/117, 111, 112, 107–110

[56] References Cited

U.S. PATENT DOCUMENTS

| | | | |
|---|---|---|---|
| 3,158,921 | 12/1964 | Yost | 407/117 |
| 3,688,366 | 9/1972 | Jones | 407/117 |
| 3,774,276 | 11/1973 | Eckle | 407/117 |
| 3,798,725 | 3/1974 | Hanson | 407/117 |
| 4,011,050 | 3/1977 | Zinner | 407/117 |
| 4,118,138 | 10/1978 | Takacs et al. | 407/117 |
| 4,195,956 | 4/1980 | Mihic | 407/117 |
| 4,332,513 | 6/1982 | Gowanlock . | |

FOREIGN PATENT DOCUMENTS

| | | |
|---|---|---|
| 853475 | 8/1977 | Belgium . |
| 59602 | 9/1982 | European Pat. Off. . |
| 2259216 | 9/1973 | Fed. Rep. of Germany . |
| 2305111 | 8/1974 | Fed. Rep. of Germany . |
| 2404302 | 8/1975 | Fed. Rep. of Germany . |
| 2252159 | 6/1975 | France . |
| 1274579 | 5/1982 | United Kingdom . |

Primary Examiner—Leonidas Vlachos
Attorney, Agent, or Firm—Vinson & Elkins

[57] ABSTRACT

The invention relates to a tool holder for cutting tools in which the tool (5) by means of V-shaped upper and lower faces (6, 13) is clamped in V-shaped recesses of a support (1) and an upper clamp (8) of a carrier (4) said tool (5) and upper clamp (8) having the axis of their V-shaped faces at an angle to the other V-shaped faces such that the tool is pressed axially against an abutment (18), the clamping of the tool being close to its cutting edge (15) and the lower support (1) and the upper clamp (8) may have a thickness smaller than the width of the cutting edge (15).

7 Claims, 11 Drawing Figures

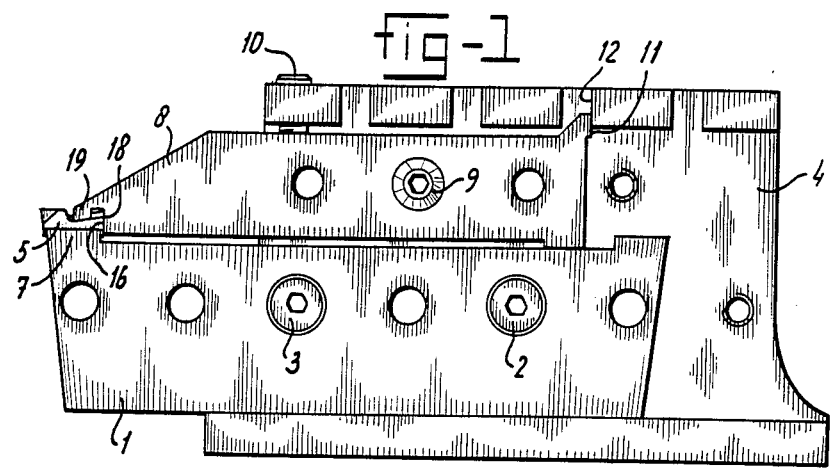

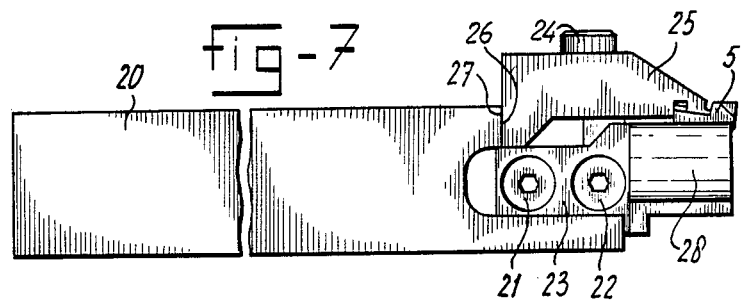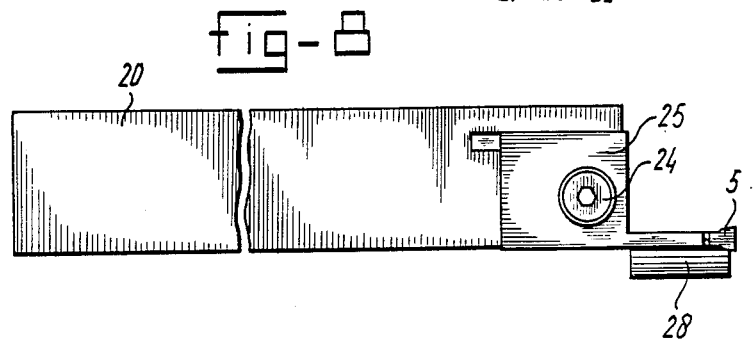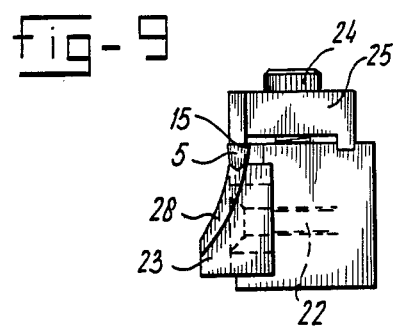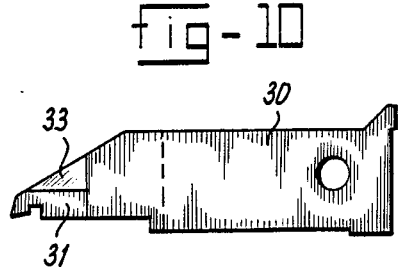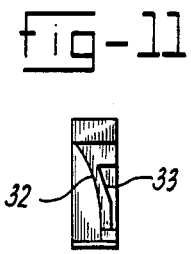

TOOL HOLDER WITH TOOL

The invention is related to a tool holder with cutting tool comprising a carrier, a lower support for the tool whether or not removably connected to the carrier, an upper clamping means, removably connected to the carrier and a tool that can be clamped between the lower support and the clamping means.

Such a tool holder with tool is known in general, see for instance "Hütte Taschenbuch für Betriebsingenieure", part 1, "Fertigungsverfahren", sixth edition, page 106.

For an accurate machining of the work piece among others a tight clamping of the tool is necessary. This tool is not allowed to give way and to come into vibration. Where possible one strives indeed always for a clamping of the tool in the tool holder at a spot as as close as possible to the cutting edge. The machining to be performed, the type of the tool related thereto and the dimensions of the tool determine its strength. Mostly in the case of slotter tools, the width of the tool is only small. It is not possible to take the necessary strength from the tool itself. This mostly is possible indeed with the tool holder where one has a greater freedom with regard to the dimensions. The latter, however, does not hold true in case of slotter tools, head slotter tools and so on, that means tools which have to penetrate deeply into the material to be machined. Mostly in that case it is necessary to look away from the principle that the clamping of the tool occurs near the cutting edge and one therefore has to use a tool of which the clamping occurs at a greater distance from the cutting edge.

Tools are subjected to wear and therefore have to be replaced regularly. It is desired that when a tool is replaced by a new one it is not necessary to adjust once more.

The aim of the invention is to provide a tool holder with tool with which the above mentioned problems can be solved.

According to the invention this aim is obtained by the fact that the tool has a V-shaped lower and/or upper face, that fits on or into a V-shaped face of the lower support and/or on or into a V-shaped face of the upper clamping means and in that the tool spaced from cutting edge and turned away therefrom has an abutting face oriented crosswise with regard to the longitudinal axis of the tool, which cutting face cooperates with an abutting face of the clamping means and/or of the lower support.

By the use of the V-shape preferably on the upper and lower face of the tool a very tight clamping, also of small tools is possible and indeed with the clamping means of the lower support or the upper clamping means respectively, that are not wider than the tool itself. By the application of an abutting face moreover an accurate positioning is obtained and therewith one only has to do when changing the tool with the tolerances in the fabrication of the tool itself and these tolerances can be kept within particularly small limits.

The V-shape at the place of the tool and the faces cooperating therewith is to produce relatively simple and accurate. The principle of the V can be applied whether only at the lower side of the tool or only at the upper side, preferably, however, above as well as below. The tip of the V can be directed downwardly or upwardly and a tool is preferred with V-shaped upper and lower face, and with the openings of the V directed towards each other, so with the tips mutually turned away. In that case one obtains namely a tool body that not withstanding the small width and thickness provides a cross section as great as possible while with a V otherwise oriented, the section would be reduced.

According to the invention one of said two mutually cooperating V-shaped faces enclose such an angle with regard to the other pair of V-shaped faces that by clamping a force component is exerted that presses together the abutment faces of tool and clamping means and/or lower support. By this is obtained that also in case of an inaccurate positioning of the tool this during clamping finds automatically its correct position against the abutment.

The upper clamping means normally is mounted with the aid of a clamping bolt. As a result of the tolerances and plays the position of the clamping means is not the same each time after releasing and tightening. The abutment face of the clamping means, however, determines the position of the tool. According to the invention therefore it is desired that the upper clamping means has an abutment face crosswise with regard to the longitudinal axis of the support, that cooperates with an abutment face of the carrier.

With the aid of V-shaped clamping and the use of abutment faces it is possible to clamp a small and little tool in a correct manner and near the cutting edge. With the intention to make this possible with slotter tools and slotter head tools with large slotter- or penetrating depths the invention also provides that the lower support and the upper clamping means at least along the entire length of the tool have a width that is less than the width of the tool at the spot of the cutting edge. So the tool in fact is clamped between two narrow tongues which easily can extend into the slot, provided by the tool.

With head cutting this slot is bent. In that case according to the invention it is desired that the lower support and/or the upper clamping means along a length that at least is equal to the length of the tool and along the part that is thinner than the width of the tool is bent according to the curve of which the axis is parallel to the longitudinal axis of the tool and of which the center lies in a face through the cutting edge. Of course the curve has to be adapted to the radius of the place of the work piece to be machined, but in case of a horizontal rotation axis of the work piece it always will have a center laying in a face extending through the axis of rotation and through the cutting edge of the tool.

In case of penetrating deeply a problem arises in connection with the discharge of the chips. A long curling strip often will have a curl width that is wider than the insertion to be made and therefore will get stuck between the walls. According to the invention it is now desired that the tool coprises a hollowing out in the effective rake edge that is narrower than the width of the cutting edge. This hollowing out has a result that the chip immediately behind the cutting edge is folded and breaks, so that as a result thereof no longer chip is obtained but a great number of small chips. This measure is known per se, however, should normally mean a weakening in the case of narrow cutting tools and the like. By the excellent clamping obtained with the V-shape that asks for little space, it now has become possible to use a chip breaking hollowing out in slotter tools and head slotter tools, so right there where this is necessary, without the appearance of undesirable vibrations.

The tool therefore also may have a normal period of life.

With the aid of drawings the invention will now be elucidated in detail.

FIG. 1 shows a side elevation of a tool holder with tool according to the invention.

FIG. 2 is an upper view of FIG. 1 and

FIG. 3 is a front view of FIG. 1.

FIG. 4 is a side view of the tool.

FIG. 5 is a back side and

FIG. 6 is a front side view.

FIG. 7 is a side view of another embodiment of the tool holder with tool according to the invention.

FIG. 8 is an upper view of FIG. 7 and

FIG. 9 is a front view of FIG. 7.

FIG. 10 is a side view of a modified embodiment of the upper clamping means and

FIG. 11 is a front view of FIG. 10.

The embodiment shown in the FIGS. 1, 2 and 3 comprises a lower support 1, that with bolts 2 and 3 is removably connected to a carrier 4 that in one or another not shown, but known per se manner can be mounted in a tool clamp of a machine.

The lower support 1 can be connected in different positions to the support and also can be reversed.

The tool in general is indicated at 5. This tool lies with a V-shaped lower side 6 in a corresponding groove of the upwardly directed nose 7 of the support 1.

The tool is clamped between the support 1 and an upper clamping means, 8, which at 9 is connected with a bolt in the carrier 4 and by a pressure screw 10 can be pressed down. This clamping means comprises an abutment face 11 that cooperates with an abutment face 12 of the carrier 4.

The FIGS. 4 to 6 inclusive show an embodiment of the tool 5. This has a V-shaped lower side 6, that is parallel to the longitudinal axis of the tool and a V-shaped upper face 13, which behind the cutting face 14 extends upwardly in a direction turned away from the cutting edge 15. Both V-shaped edges end at the spot of the abutment face 16. The chip breaking hollowing out 17 is indicated with dotted lines in FIGS. 4 and 6. FIG. 5 shows that with V-shaped sections of the tool that are directed from each other, this still may have a relative large cross section.

The abutment face 16 abuts an abutment face 18 of the upper clamping means 8. The end thereof, indicated at 19, has a V-shaped slot, which in a corresponding way is inclined as the V-shaped upper part 13 of the tool. When clamping the tool 5 its abutment face 16 will be pressed against the abutment face 18, in such a manner that also by the determination of the position of the upper clamping means 8 by the abutment faces 11 and 12 the position of the tool 5 is guaranteed. The position of the cutting edge 15 still only is influenced by tolerances in the length of the tool and this can be kept easily within a region of two hundredths of a millimeter.

In the FIGS. 7 to 9 inclusive another embodiment is shown in which the carrier 20 comprises a rod with square section in which with bolts 21 and 22 the lower support 23 is mounted and upon which with the aid of the clamping bolt 24 the upper clamping means 25 is connected, which clamping means with its rear end 26 lies against a shoulder 27 of the carrier 20 that serves as abutment face.

Tool 5 is clamped in the same manner as shown in FIGS. 1 to 3 inclusive.

This embodiment furthermore differs from the above described shape by the shape of the part of the lower support 23 present below the tool. This part comprises, as appears from FIG. 9, a thin tongue 28 that is bent and that is thinner than the width of the cutting edge 15 of the tool. During slotting the feed direction of the tool is parallel to the axis of the work piece to be machined. By giving the correct curve to the bent part 28 it is possible to cut a slot in the head of a work piece within a determined region, that is determined by the thickness and the radius of the curve.

Situations may occur whereby this also is desirable at the upper side, in which case a clamping means can be taken as shown in FIGS. 10 and 11. This clamping means 30 has a shape that is suitable for application in the embodiment of FIG. 1. However, the embodiment shown in FIGS. 10 and 11 also can be used in the embodiment according to FIGS. 7 to 9 inclusive.

The essence of the embodiment of the upper clamping means according to FIGS. 10 and 11 is that the front end of the upper clamping means 30, that is indicated by 31 in the way as shown in FIG. 11, comprises an inwardly turned curve 32 with a bevel 33 at the outer side.

The embodiment shown in the FIGS. 7 to 9 inclusive shows the longitudinal axis of the tool 5 parallel to the longitudinal axis of the carrier 20. However, it is also possible to position the longitudinal axis of the tool 5 with an angle of for instance 90° with regard to the longitudinal axis of the carrier 20. Therefore only a possibility of mounting is necessary for the lower support against the head of the carrier 20 and a rotation of the upper clamping means about for instance 90° in which case, however, the abutment face of the upper clamps on the carrier preferably remains at the same spot.

I claim:

1. A tool holder with a cutting tool comprising
   a carrier;
   a lower support for said cutting tool releasably connected to said carrier;
   an upper clamping member releasably connected to said carrier located above said lower support and parallel to said lower support;
   a cutting tool that is clamped between said lower support and said clamping member, said tool having a rear attachment portion which in each cross section perpendicular to said tool's longitudinal axis has been provided with a downwardly converging lower face and an upwardly converging upper face, said lower and upper faces cooperating with a downwardly converging groove of the lower support and an upwardly converging groove of the clamping member respectively;
   said lower and upper faces of the attachment portion of said tool as well as the cooperating faces of the grooves of said supporting member and said clamping member extending at an angle to each other which opens in a direction away from the cutting edge of said tool with the lower face and cooperating groove extending substantially parallel to the plane through the cutting edge of the tool and the center of a cylindrical working piece, said plane defining the chip angle with respect to the top surface of said tool at the cutting edge;
   said tool further having a rear abutting face in a plane perpendicular to said tool's longitudinal axis and cooperating with an abutment of said clamping member.

2. A tool holder as claimed in claim 1 wherein said upper clamping member comprises at its rear end an abutment face extending in a plane perpendicular to the longitudinal axis of the carrier and cooperating with an abutment face of the carrier.

3. A tool holder as claimed in claim 1, wherein said lower support and said upper clamping member over at least the entire length of the tool have a width which is smaller than the width of the tool measured at the cutting edge.

4. A tool holder as claimed in claim 3 wherein said lower support over a length which is at least equal to the length of the tool and along that part which is of smaller width than the width of the cutting edge of the tool, is curved according to a curved plane having its axis parallel to the longitudinal axis of the tool and its center of curvature in a plane through the cutting edge.

5. A tool holder as claimed in claim 1, wherein said lower support and said upper clamping member over at least the entire length of the tool have a width which is smaller than the width of the tool measured at the cutting edge.

6. A tool holder as claimed in claim 1 wherein said tool has in its upper surface immediately next to the cutting edge a downwardly curved hollowed out portion in the effective rake face of the tool in which said hollowed out portion is narrower than the width of the cutting edge of said tool.

7. A tool holder with a cutting tool comprising a carrier;
a lower support for said cutting tool releasably connected to said carrier;
an upper clamping member releasably connected to said carrier located above said lower support and parallel to said lower support;
a cutting tool that is clamped between said lower support and said clamping member, said tool having a rear attachment portion which in each cross section perpendicular to said tool's longitudinal axis has been provided with a downwardly converging lower face and an upwardly converging upper face, said lower and upper faces cooperating with a downwardly converging groove of the lower support and an upwardly converging groove of the clamping member respectively;
said lower and upper faces of the attachment portion of said tool as well as the cooperating faces of the grooves of said supporting member and said clamping member extending at an angle to each other which opens in a direction away from the cutting edge of said tool with the lower face and cooperating groove extending substantially parallel to the plane through the cutting edge of the tool and the center of a cylindrical working piece, said plane defining the chip angle with respect to the top surface of said tool at the cutting edge;
said tool further having a rear abutting face in a plane perpendicular to said tool's longitudinal axis and cooperating with an abutment of said clamping member.

* * * * *